Nov. 29, 1960 J. P. SIMON 2,962,037
SPEED RESPONSIVE FLUID GOVERNOR
Filed Oct. 18, 1956 2 Sheets-Sheet 1
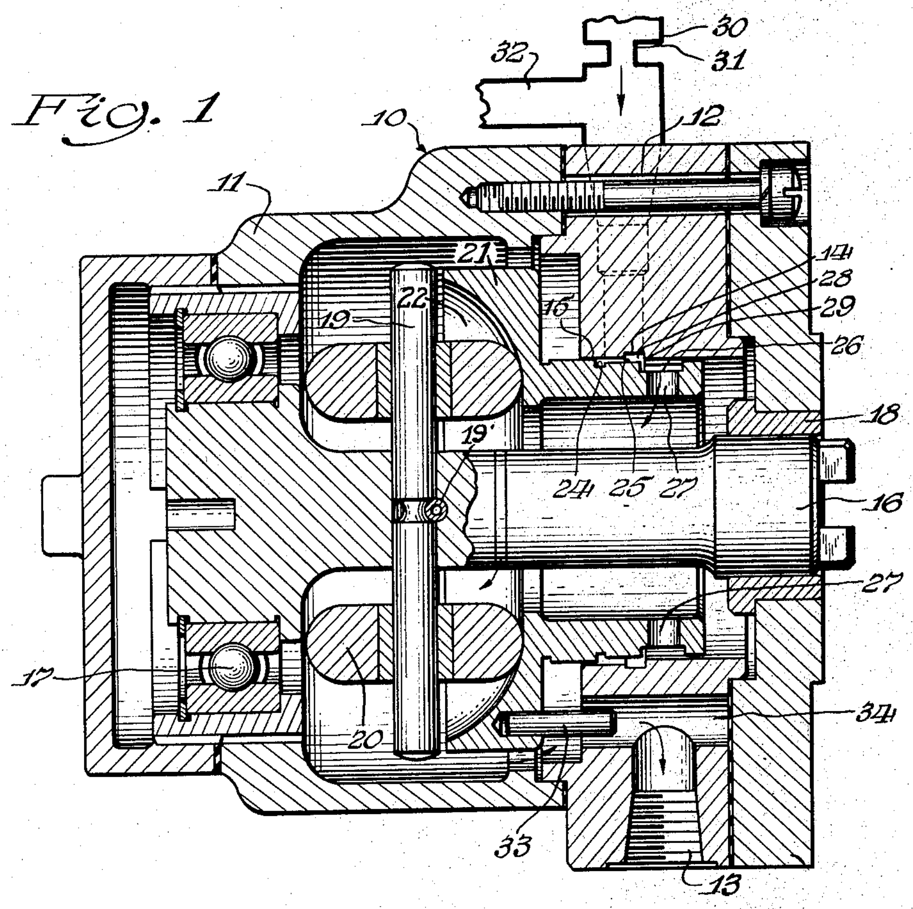
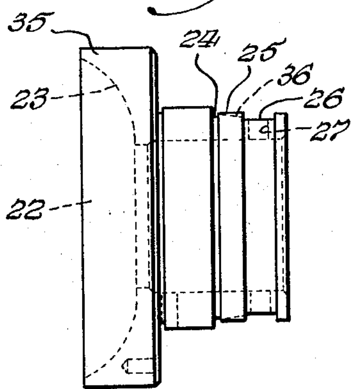
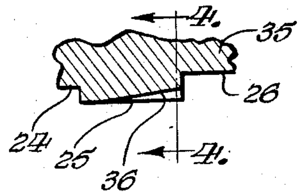
Fig. 4
35 36
Inventor
John P. Simon
Paul O. Pippel
Attorney SPEED RESPONSIVE FLUID GOVERNOR
Filed Oct. 18, 1956 2 Sheets-Sheet 2
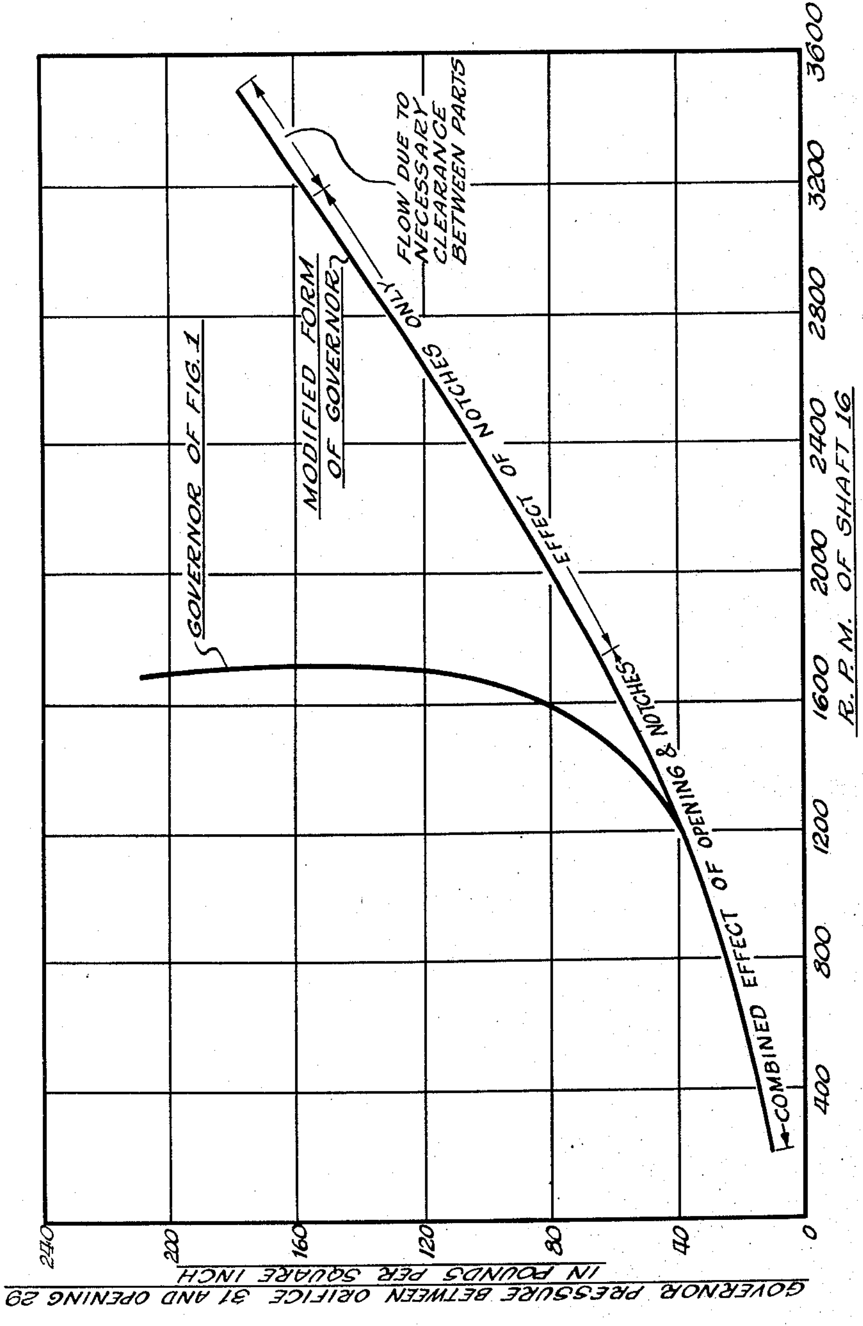
Inventor
John P. Simon
Paul O. Pippel
Attorney United States Patent Office 2,962,037

Patented Nov. 29, 1960

2,962,037

SPEED RESPONSIVE FLUID GOVERNOR

John P. Simon, Glen Ellyn, Ill., assignor to International Harvester Company, a corporation of New Jersey Filed Oct. 18, 1956, Ser. No. 616,794

13 Claims. (Cl. 137—53)

This invention relates to governors and is primarily concerned with a speed responsive fluid governor.

An object of the invention is to provide a governor that is extremely sensitive to speed changes.

Another object of the invention is to provide a governor that is compact and occupies a small amount of space.

A further object of the invention is to provide a governor that is made up of a small number of parts.

The foregoing and other objects of the invention will be apparent from the construction and arrangement illustrated in the accompanying drawings wherein:

Figure 1 is a longitudinal sectional view through a governor with a variable sized opening in the governor in the full open position, Figure 2 is a detail view of a modified form of member for the governor, Figure 3 is an enlarged longitudinal sectional view of a portion of the member shown in Figure 2 illustrating one of the notches in the member, Figure 4 is a sectional view taken on the line 4—4 of Figure 3, and Figure 5 is a graph showing curves for governor speed plotted against governor pressure.

The invention proposes an improved governor. The governor is comprised of a hollow body provided with an inlet and an outlet and a rotatably mounted shaft. Means are carried by the shaft and move in response to speed changes of the shaft. A circular member is disposed in the body and is in contact with the means. The inner face of the body and the member are cut away so as to together provide an annular area and an opening variable in size. A source of fluid under pressure is connected to the inlet and the fluid flows through the inlet through the annular area and the variable opening and out the outlet. The means urges the member in one direction tending to close the opening while the pressure of the fluid against the annular area urges the member in the opposite direction tending to increase the size of the opening. This governor is extremely sensitive to speed changes and is compact and occupies a small amount of space and is made up of a small number of parts.

In the drawings, 10 generally designates a governor having a hollow body 11 generally circular in transverse cross section. The body 11 is provided with an inlet 12 and an outlet 13 and an annular groove 14 in its inner face and an annular reduced surface 15 in its inner face adjoining the groove. A shaft 16 is rotatably mounted in the body 11 through bearings 17 and 18 mounted in the body. A rod 19 is disposed in the body 11 and extends transversely through the shaft and is fixedly secured to the shaft by a roll pin 19' and a pair of rollers 20 are rotatably and slidably mounted on the rod on opposite sides of the shaft. A hollow member 21 is made up of two integral cylindrical sections of different diameter and is disposed in the body 11 and surrounds the shaft 16 and is spaced therefrom. The member 21 is provided with a recess 22 formed by a wall 23 which is curved and is in contact with the rollers 20. The member 21 is further provided with an annular groove 24 and an annular reduced surface 25 adjoining the groove 24 and an annular groove 26 in the reduced surface and a pair of diametrically opposed holes 27 in communication with the groove 26 and the interior of the member. The reduced surface 25 of the member is in sliding engagement with the inner face of the body 11 and the reduced surface 15 of the body is in sliding engagement with the outer face of the member. The reduced surface 15 of the body and the groove 24 of the member and the groove 14 in the body and the reduced surface 25 of the member and the inner face of the body together form an annular space 28 and the groove 14 in the body and the groove 26 in the member together form an opening 29 variable in size. The size of the opening 29 at any particular time is determined by the position of the member 21. A conduit 30 is connected to the inlet 12 in the member and has an orifice 31 therein of a dimension smaller than the conduit and the conduit is connected to a source of fluid under pressure, the fluid being oil. A conduit 32 is connected to the conduit 30 between orifice 31 and the opening 29 and leads to a device to be governed. The outlet 13 is connected to a reservoir so that the oil is moved out of the outlet and into the reservoir and it is pumped into the conduit 30 where it again flows into the inlet 12. The shaft 16 is operatively connected to the device to be governed so that it may be rotated by the device. A pin 33 is fitted tightly in an opening in the member 21 and projects into an opening 34 in the body so that the member is nonrotatably mounted in the body. The opening 34 is in communication with the outlet 13.

The flow through the governor shown in Figure 1 assuming the opening 29 to be open is as follows: Oil under pressure passes through the orifice 31 then flows into the inlet 12 and then into the annular space 28. The oil then flows through opening 29 and then through holes 27 to the interior of the member and onto the shaft 16 and over the wall 23 and then past pin 33 into opening 34 and then through outlet 13. The mode of operation of the governor shown in Figure 1 is as follows: Rotation of the shaft 16 causes rollers 20 to rotate about rod 19 and roll on wall 23 and to be moved outwardly on the rod by centrifugal force urging the member 21 to the right as viewed in Figure 1 and tending to close the opening 29. The pressure of the oil against the annular area urges the member 21 to the left against the rollers 20 and tends to increase the size of the opening 29. This action continues until a balance point is reached whereby the hydraulic axial force on the member 21 exactly equals the axial component of the force the rollers 20 exert on the member at the speed at which the shaft 16 is rotating. An increase in speed of the shaft 16 would cause the member 21 to be moved to the right against the oil pressure in the annular area tending to close the opening 29 and a decrease in the speed of the shaft would result in the rollers 20 moving toward the shaft allowing the oil pressure in the annular area to move the member to the left to increase the size of the opening. The variation of oil pressure in the conduit 30 and the inlet 12 between orifice 31 and opening 29 does the governing.

In Figures 2, 3 and 4 a modified form of governor is produced by changing the member. A member 35 has the same structure as member 21 except that a pair of diametrically opposed notches 36 are provided in the reduced surface 25 between grooves 24 and 26. Each notch 36 is in communication with groove 26 and gradually decreases in depth from groove 26 until it terminates at the reduced surface 25 at a location slightly spaced from groove 24. The operation of this modified governor is the same as that of the governor of Figure 1 except that the notches 36 allow greater movement of the member 35 before the variable opening 29 is closed.

In Figure 5 "R.P.M. of shaft 16" is plotted as abscissas against "Governor pressure between orifice 31 and opening 29 in pounds per square inch" as ordinates. The curve on the left in Figure 5 is for the governor shown in Figure 1 and the curve on the right is for the modified form of governor. The curve for the modified form of governor has one section designated "Combined effect of opening and notches" and another section designated "Effect of notches only" and still another section designated "Flow due to necessary clearance between parts." The modified form of governor has the advantage that it will operate over a wider range of speeds than the governor of Figure 1 as can be seen by comparing the curves in Figure 5. In the past it has been necessary to use two governors to get an operating range equivalent to that of the modified form of governor. The shape of the speed pressure curves shown in Figure 5 can be changed by changing the curvature of wall 23 for the governor of Figure 1 or by changing either the curvature of wall 23 or by varying the number, size or shape of the notches 36 for the modified form of governor.

Both forms of governors have the advantage of being extremely sensitive to speed changes. Due to the inability to machine parts to correct dimensions there will be irregular parts. Due to allowable tolerances of parts there will be a space between the parts. The governor body and the member will both be slightly irregular and there will be allowable tolerances of the body and the member. Due to this irregularity of parts and tolerances of the parts the member will be in constant motion or at least in a state of vibration so that there will be no static friction in the governor. There will be a film of oil under pressure between the governor body and the member so that the sliding friction will be further lowered. Applicant's governors are compact and occupy a small amount of space and are made up of a small number of parts. Most governors used in the past have utilized springs but in applicants governors the use of springs is eliminated.

It would be possible to have the bottom of the groove 26 of the member to extend to the end of the member adjacent the bearing 18 so that the groove would become a reduced surface and to extend the outlet upwardly as shown in Figure 1 until it is in communication with the space between the end of the member and the bearing. The oil would then flow over the end of the member and out the outlet. It would also be possible to have a plurality of spaced reduced surfaces in place of groove 26 extending to the end of the member adjacent bearing 18 with each of the reduced surfaces being in the form of a segment of a circle with the outlet changed as set forth in this paragraph. It would also be possible to provide a plurality of spaced slots extending from groove 26 to the end of the member adjacent bearing 18 with the outlet changed as set forth in this paragraph. With the three types of changes set forth in this paragraph the holes 27 would not be necessary.

What is claimed is:

1. A governor comprising a hollow body provided with an inlet for fluid under pressure and an outlet and an annular groove in its inner face, a shaft rotatably mounted in the body, speed responsive means carried by the shaft, and a cylindrical member disposed in the body and in contact with the means and provided with an annular reduced surface and the outer face of the member being in sliding engagement with the inner face of the body, the reduced surface of the member and a wall between the outer face of the member and the reduced surface and the groove in the body together forming an annular space and an opening variable in size, the speed responsive means urging the cylindrical member in one direction and the fluid in the annular space urging the cylindrical member in the opposite direction.

2. A governor comprising a hollow body provided with an inlet for fluid under pressure and an outlet and an annular groove in its inner face, a shaft rotatably mounted in the body, means carried by the shaft and subject to centrifugal force, and a cylindrical member disposed in the body and in contact with the means and provided with an annular reduced surface and the outer face of the member being in sliding engagement with the inner face of the body, the reduced surface of the member and a wall between the outer face of the member and the reduced surface and the groove in the body together forming an annular space and an opening variable in size, the means urging the cylindrical member in one direction and the fluid in the annular space urging the cylindrical member in the opposite direction.

3. A governor comprising a hollow body provided with an inlet and an outlet and an annular groove in its inner face, a shaft rotatably mounted in the body, means carried by the shaft and subject to centrifugal force, a cylindrical member disposed in the body and in contact with the means and provided with an annular reduced surface and the outer face of the member being in sliding engagement with the inner face of the body, the reduced surface of the member and a wall between the outer face of the member and the reduced surface and the groove in the body together forming an annular space and an opening variable in size, and a conduit connected to the inlet and having an orifice therein of a dimension smaller than the conduit and being connected to a source of fluid under pressure, the means urging the cylindrical member in one direction and the fluid in the annular space urging the cylindrical member in the opposite direction.

4. A governor comprising a hollow body provided with an inlet and an outlet and an annular groove in its inner face, a shaft rotatably mounted in the body, means carried by the shaft and rotatably and slidably mounted with respect to an axis extending transversely of the shaft and subject to centrifugal force, a hollow cylindrical member disposed in the body and surrounding the shaft and spaced therefrom and in contact with the means and provided with an annular groove and diametrically opposed holes in communication with the groove and the interior of the member and the outer face of the member being in sliding engagement with the inner face of the body and the grooves in the member and the body together forming an annular space and an opening variable in size, and a conduit connected to the inlet and having an orifice therein of a dimension smaller than the conduit and being connected to a source of fluid under pressure, the means urging the hollow cylindrical member in one direction and the fluid in the annular space urging the hollow cylindrical member in the opposite direction.

5. A governor comprising a hollow body provided with an inlet and an outlet and an annular groove in its inner face, a shaft rotatably mounted in the body, means carried by the shaft and rotatably and slidably mounted with respect to an axis extending transversely of the shaft and subject to centrifugal force, a hollow cylindrical member disposed in the body and surrounding the shaft and spaced therefrom and in contact with the means and provided with an annular groove and diametrically opposed notches in communication with the groove and diametrically opposed holes in communication with the groove and the interior of the member and the outer face of the member being in sliding engagement with the inner face of the body, the grooves in the member and the body together forming an annular space and the groove and the notches in the member and the groove in the body together forming an opening variable in size, and a conduit connected to the inlet and having an orifice therein of a dimension smaller than the conduit and being connected to a source of fluid under pressure, the means urging the hollow cylindrical member in one direction and the fluid in the annular space urging the hollow cylindrical member in the opposite direction.

6. A governor comprising a hollow body provided with an inlet and an outlet and an annular groove in its inner face and an annular reduced surface in its inner face adjoining the groove, a shaft rotatably mounted in the body, a rod disposed in the body and extending transversely of the shaft and fixedly secured thereto, a pair of rollers slidably and rotatably mounted on the rod on opposite sides of the shaft, a hollow cylindrical member disposed in the body and surrounding the shaft and spaced therefrom and having a recess and the wall of the recess being curved and in contact with the rollers and provided with a first annular groove and an annular reduced surface adjoining the first groove and a second annular groove in the reduced surface and the reduced surface of the member being provided with diametrically opposed holes in communication with the second groove and the interior of the member and the reduced surface of the member being in sliding engagement with the inner face of the body and the reduced surface of the body being in sliding engagement with the outer face of the member and the reduced surface of the body and the first groove of the member and the groove in the body and the reduced surface of the member and the inner face of the body and the second groove of the member together forming an annular space and the groove in the body and the second groove in the member together forming an opening variable in size, and a conduit connected to the inlet and having an orifice therein of a dimension smaller than the conduit and being connected to a source of fluid under pressure, the rollers moving outwardly on the rod by centrifugal force and urging the hollow cylindrical member in one direction and the fluid in the annular space urging the hollow cylindrical member in the opposite direction.

7. A governor comprising a hollow body provided with an inlet and an outlet and an annular groove in its inner face and an annular reduced surface in its inner face adjoining the groove, a shaft rotatably mounted in the body, a rod disposed in the body and extending transversely of the shaft and fixedly secured thereto, a pair of rollers on the rod on opposite sides of the shaft, a hollow cylindrical member disposed in the body and surrounding the shaft and spaced therefrom and having a recess and the wall of the recess being curved and in contact with the rollers and provided with a first annular groove and an annular reduced surface adjoining the first groove and a second annular groove in the reduced surface and the reduced surface of the member being provided with diametrically opposed notches between the first and second grooves and diametrically opposed holes in communication with the second groove and the interior of the member and the reduced surface of the member being in sliding engagement with the inner face of the body and the reduced surface of the body being in sliding engagement with the outer face of the member and the reduced surface of the body, the first groove of the member and the groove in the body and the reduced surface of the member and the inner face of the body and the second groove of the member together forming an annular space and the groove in the body and the second groove and the notches in the member together forming an opening variable in size, and a conduit connected to the inlet and having an orifice therein of a dimension smaller than the conduit and being connected to a source of fliud under pressure, the rollers moving outwardly on the rod by centrifugal force and urging the hollow cylindrical member in one direction and fluid in the annular space urging the hollow cylindrical member in the opposite direction.

8. A governor comprising a hollow body provided with an inlet for fluid under pressure and an outlet and an annular groove in its inner face and an annular reduced surface in its inner face adjoining the groove, means subject to centrifugal force, and a cylindrical member disposed in the body and in contact with the means and provided with an annular groove and a first annular reduced surface adjoining the first groove and a second annular reduced surface in the first reduced surface and the first reduced surface of the member being in sliding engagement with the inner face of the body and the reduced surface of the body being in sliding engagement with the outer face of the member and the reduced surface of the body, the groove in the member and the groove in the body and the first reduced surface of the member and the inner face of the body and the second reduced surface together forming an annular space and the groove in the body and a wall between the first and second reduced surfaces of the body together forming an opening variable in size, the means urging the cylindrical member in one direction and the fluid in the annular space urging the cylindrical member in the opposite direction.

9. A governor comprising a hollow body provided with an inlet for fluid under pressure and an outlet and an annular groove in its inner face and an annular reduced surface in its inner face adjoining the groove, means subject to centrifugal force, and a hollow cylindrical member disposed in the body and in contact with the means and provided with a first annular groove and an annular reduced surface adjoining the first groove and a second annular groove in the reduced surface and the reduced surface of the member being provided with a plurality of holes in communication with the second groove and the interior of the member and the reduced surface of the member being in sliding engagement with the inner face of the body and the reduced surface of the body being in sliding engagement with the outer face of the member, the reduced surface of the body and the first groove of the member and the groove in the body and the reduced surface of the member and the inner face of the body and the second groove of the member together forming an annular space and the groove in the body and the second groove in the member together forming an opening variable in size, the means urging the hollow cylindrical member in one direction and fluid in the annular space urging the hollow cylindrical member in the opposite direction.

10. A governor comprising a hollow body provided with an inlet for fluid under pressure and an outlet and an annular groove in its inner face and an annular reduced surface in its inner face adjoining the groove, means subject to centrifugal force, and a hollow cylindrical member disposed in the body and in contact with the means and provided with a first annular groove and an annular reduced surface adjoining the first groove and a second annular groove in the reduced surface and the reduced surface of the member being provided with a plurality of notches between the first and second grooves and a plurality of holes in communication with the second groove and the interior of the member and the reduced surface of the member being in sliding engagement with the inner face of the body and the reduced surface of the body being in sliding engagement with the outer face of the member, the reduced surface of the body and the first groove of the member and the groove in the body and the reduced surface of the member and the inner face of the body and the second groove of the member together forming an annular space and the groove in the body and the second groove and the notches in the member together forming an opening variable in size, the means urging the hollow cylindrical member in one direction and the fluid in the annular space urging the hollow cylindrical member in the opposite direction.

11. A governor control means comprising a hollow cylindrical member provided with a first annular groove and an annular reduced surface adjoining the first groove and a second annular groove in the reduced surface, the reduced surface being provided with a plurality of holes in communication with the second groove and the interior of the member.

12. A governor control means comprising a cylindrical member having an outlet and provided with an annular groove and a first annular reduced surface adjoining the groove and a second annular reduced surface in the first reduced surface and in communication with the outlet, the first reduced surface being provided with a plurality of notches between the groove and the second reduced surface and being deeper near the second reduced surface.

13. A governor control means comprising a hollow cylindrical member provided with a first annular groove and an annular reduced surface adjoining the first groove and a second annular groove in the reduced surface, the reduced surface being provided with a plurality of notches between the first and second grooves and being deeper near the second groove and a plurality of holes in communication with the second groove and the interior of the member.

References Cited in the file of this patent

UNITED STATES PATENTS

| | | |
|---|---|---|
| 1,205,127 | Herr | Nov. 14, 1915 |
| 1,940,024 | Shaff | Dec. 19, 1933 |
| 2,711,749 | Hettinger | June 28, 1955 |
| 2,762,384 | Rosenberger | Sept. 11, 1956 |
| 2,853,891 | Tuck | Sept. 30, 1958 |